Aug. 2, 1966  L. M. ARGUESO, JR., ETAL  3,264,128
COMPOSITION FOR PREPARING THIN-WALLED CORED OBJECTS PREPARATORY
TO PERFORMING MACHINING OPERATIONS THEREON
Original Filed Dec. 13, 1961

INVENTORS
LUIS M. ARGUESO, JR.
CYRIL S. TREACY
BY
Robertson Smythe & Bryan
ATTORNEYS

United States Patent Office

3,264,128
Patented August 2, 1966

3,264,128
COMPOSITION FOR PREPARING THIN-WALLED CORED OBJECTS PREPARATORY TO PERFORMING MACHINING OPERATIONS THEREON
Luis M. Argueso, Jr., White Plains, and Cyril S. Treacy, Scarsdale, N.Y., assignors to M. Argueso & Co., Inc., Mamaroneck, N.Y., a corporation of New York
Original application Dec. 13, 1961, Ser. No. 159,079, now Patent No. 3,176,387, dated Apr. 6, 1965. Divided and this application July 24, 1964, Ser. No. 384,850
3 Claims. (Cl. 106—287)

This application is a division of application Serial No. 159,079, filed December 13, 1961, now U.S. Patent 3,176,387.

The present invention relates to a new and improved method of, and compound for preparing thin-walled objects such as honeycomb structures made of aluminum, stainless steel, plastics, glass and the like, as well as other structures having cores surrounded by thin walls, preparatory to performing a machining and cutting operation thereon.

In modern industries, structures of the above-referred-to type require various machining operations including cutting, grinding, routing and the like. Many of these structures are composed of materials that cannot tolerate any substantial heating, so that the use of low temperature alloys and high melting point waxes and the like are not suitable to fill the interstices and cores prior to a machining operation being performed thereon.

The principal object of this invention is to provide a method of, and compound for preparing thin-walled single or multi-core objects preparatory to performing machining operations thereon.

Another object of the invention is to provide such a method and compound that will permit the machining of thin-walled objects without requiring the application of heat to remove the compound from the interstices or cores after a machining operation has been performed.

Still another object of the invention is to provide such a method and compound that will include the removal of the compound from the interstices or cores by an aqueous solution at substantially ambient temperature.

In one aspect of the invention, a thin-walled multi-core object, such as a honeycomb structure made up of thin aluminum sheet or the like, may have its voids filled with a compound including a water soluble wax such as polyethylene glycol having a predetermined molecular weight.

In another aspect of the invention, the polyethylene glycol may be admixed with a metallic carbonate and finely divided mica and/or spun glass fiber and other similar materials. The resulting compound may be introduced into the structure by melting the same, which has no adverse effects on the unmachined article. However, it is often necessary to avoid the application of heat to the machined object because of adverse physical effects on the machined object.

The filled object may then be held in a conventional manner on the bed of a machine, and grinding, milling, routing and other operations may be performed on the object without damage to the fragile, thin walls surrounding the voids in the object because of the support provided by the solid wax within the interstices or cores. Upon completion of the machining operations, the compound within the interstices or cores may be removed by subjecting the object to an aqueous acid solution at room temperature which effectively removes all traces of the compound from the object and leaves no film of the compound on the walls of the object with no residual effect on brazing or other similar properties thereof. Accordingly, the machined object may be brazed or otherwise fastened to sheet material or the like, depending upon the end use to which the object is to be put.

In process handling, because of the fragile nature of the thin-walled honeycomb core, damage is reduced considerably by filling the core with the compound prior to machining. The filled core can also be stored prior to machining in far less space than is required when the core is not filled. Due to the fragile nature of the core, it cannot be stored one on top of another without being filled with some kind of material, such as the compound of the present invention, which will prevent distortion of the core.

With the use of the compound and simple machining methods, the cutting time of the honeycomb core can be reduced 40% to 60% as compared with processes such as those employing an aqueous vehicle. In addition to saving valuable time in the cutting operation, the compound also allows the user to cut honeycomb core with a capital equipment investment of only 8% to 10% of that required for aqueous vehicle processes.

The above, other objects and novel features of the invention will become apparent from the following specification and accompanying drawing which is merely exemplary.

Figure 1:
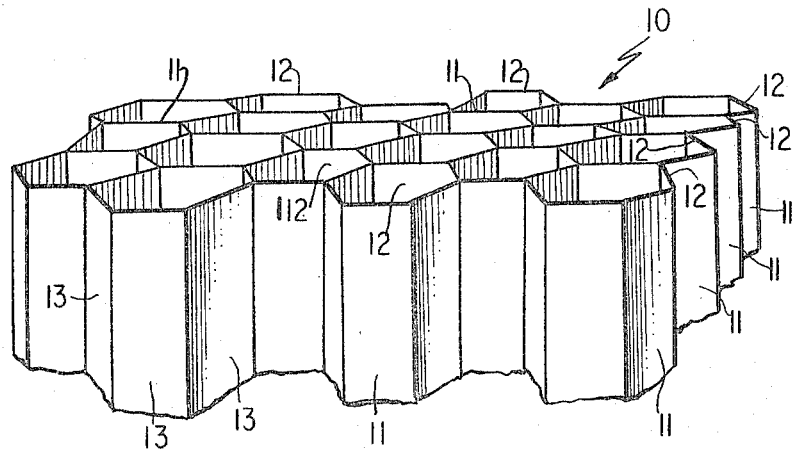
FIG. 1 is a perspective view of a piece of honeycomb material.
Figure 2:
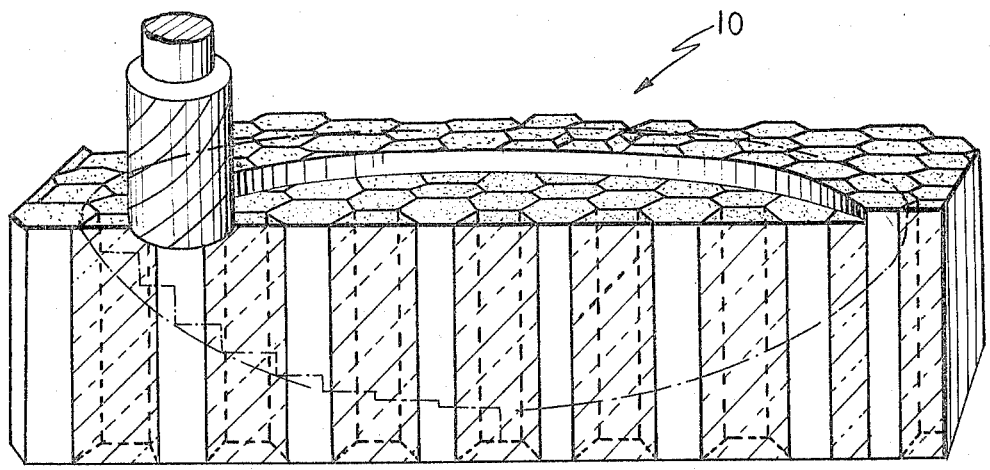
FIG. 2 is a view of a piece of honeycomb filled with the compound of this invention, in position and being machined by a routing cutter.
Figure 3:
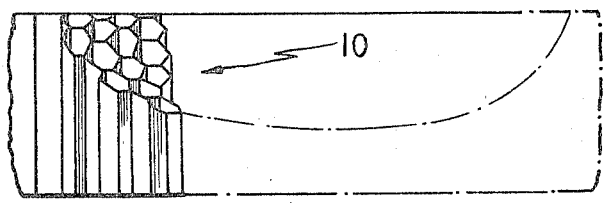
FIG. 3 is a perspective view of a contour machined piece of honeycomb material after the compound of the invention has been removed from its cores or interstices.

Referring to FIG. 1, a honeycomb construction 10 is shown as composed of a plurality of alternating thin strips 11 and 12 of material such as aluminum, stainless steel, or other suitable alloy materials, and which may be made by forming the strips along a sinusoidal curve or modified sinusoidal curve in which latter form the general curve is formed of rectilinear portions 13. The strips 11 and 12 may be alternately reversed held in contact and cemented or brazed along contacting lines or surfaces in order to form the honeycomb structure. Of course, the honeycomb structure may also be made of other materials such as cardboard, rubber, plastic, glass and the like. In fact, the method and compound of the present invention may be utilized in the machining of any thin-walled object where the walls are subject to damage incident to the machining operation.

It has been found that the admixture of predetermined quantities of water soluble waxes such as polyethylene glycol having molecular weights of from about 6,000 to 20,000, very finely water-ground mica and/or spun glass fiber and similar materials, and a carbonate, produces a compound that when molten can be poured into the interstices or cores of thin-walled objects and, upon cooling to room temperature, sets up, producing a hard and strong supporting medium that adheres to the thin walls and will not chip or flake when the object filled therewith is machined.

Examples of the compound are:

(I)

| | Parts by weight |
|---|---|
| Polyethylene glycol (6,000 molecular wt.) | 70 |
| Very fine water-ground mica | 10 |
| $NaHCO_3$ (precipitated, very fine) | 20 |
| | 100 |

(II)

| | |
|---|---|
| Polyethylene glycol (6,000 molecular wt.) | 60 |
| Very fine water-ground mica | 10 |
| NaHCO$_3$ (precipitated, very fine) | 30 |
| | 100 |

(III)

| | |
|---|---|
| Polyethylene glycol (6,000 molecular wt.) | 55 |
| Very fine water-ground mica | 5 |
| NaHCO$_3$ (precipitated, very fine) | 40 |
| | 100 |

(IV)

| | |
|---|---|
| Polyethylene glycol (4,000 molecular wt.) | 70 |
| Very fine water-ground mica | 10 |
| NaHCO$_3$ (precipitated, very fine) | 20 |
| | 100 |

(V)

| | |
|---|---|
| Polyethylene glycol (6,000 molecular wt.) | 42 |
| Very fine water-ground mica | 10 |
| Chlorinated terphenyl (Aroclor 5460) | 8 |
| NaHCO$_3$ (precipitated, very fine) | 40 |
| | 100 |

(VI)

| | |
|---|---|
| Polyethylene glycol (20,000 molecular wt.) | 12 |
| Polyethylene glycol (6,000 molecular wt.) | 48 |
| Very fine water-ground mica | 10 |
| NaHCO$_3$ (precipitated, very fine) | 30 |
| | 100 |

(VII)

| | |
|---|---|
| Polyethylene glycol (20,000 molecular wt.) | 14 |
| Polyethylene glycol (6,000 molecular wt.) | 56 |
| Very fine water-ground mica | 10 |
| NaHCO$_3$ (precipitated, very fine) | 20 |
| | 100 |

(VIII)

| | |
|---|---|
| Polyethylene glycol (20,000 molecular wt.) | 14 |
| Polyethylene glycol (6,000 molecular wt.) | 56 |
| Very fine water-ground mica | 10 |
| CaCO$_3$ (precipitated, very fine) | 20 |
| | 100 |

(IX)

| | |
|---|---|
| Polyethylene glycol (20,000 molecular wt.) | 14 |
| Polyethylene glycol (6,000 molecular wt.) | 56 |
| Spun glass fiber | 10 |
| CaCO$_3$ (precipitated, very fine) | 20 |
| | 100 |

(X)

| | |
|---|---|
| Polyethylene glycol (20,000 molecular wt.) | 14 |
| Polyethylene glycol (6,000 molecular wt.) | 56 |
| Very fine water-ground mica and spun glass fiber | 10 |
| CaCO$_3$ (precipitated, very fine) | 20 |
| | 100 |

In Examples I to VIII, the water-ground mica may be replaced by spun glass fiber 10% or by a mixture of water-ground mica and spun glass fiber 10%.

The compound may be made simply by heating the polyethylene glycol to a molten condition and stirring into it the finely divided mica and/or spun glass fiber, and metal carbonate until it is thoroughly mixed therein. The molten compound may be poured into the interstices of the honeycomb or cores of thin-walled objects and permitted to solidify at room temperature.

The filled object may then be held on a machine tool bed by conventional means such as vacuum chucking or in other suitable fashions, and any desired machining operations may be performed on the filled object. When the object has been properly machined, the compound may be completely removed from the interstices or cores by subjecting it to a five percent (5%) aqueous solution of hydrochloric or acetic acid. While the aqueous solution of acetic acid is very effective with the compounds including NaHCO$_3$, it has been found that the HCl aqueous solution is better for the compound employing CaCO$_3$. Increased removal of the compound from the object may be accomplished by elevating the temperature of the aqueous acid solution. The use of CaCO$_3$ has been found to be particularly useful because it does not release CO$_2$ when heated to the temperature concerned herein.

The resulting machined object, after removal of the compound as above outlined, may be brazed to sheets of material if so desired, and no deleterious aftereffects of the compound will be present.

Although the various features of the new and improved method of, and compound for the treating of thin-walled objects preparatory to performing machining operations on the objects have been shown and described in detail to fully disclose several embodiments of the invention, it will be evident that changes may be made in such details and certain features may be used without others without departing from the principles of the invention.

What is claimed is:

1. A composition consisting essentially of 14 parts by weight of polyethylene glycol having a molecular weight of about 20,000, 56 parts by weight of polyethylene glycol having a molecular weight of about 6,000, 10 parts by weight of finely divided mica, and 20 parts by weight of precipitated calcium carbonate (CaCO$_3$).

2. A composition consisting essentially of 14 parts by weight of polyethylene glycol having a molecular weight of about 20,000, 56 parts by weight of polyethylene glycol having a molecular weight of about 6,000, 10 parts by weight of spun glass fiber, and 20 parts by weight of precipitated calcium carbonate (CaCO$_3$).

3. A composition consisting essentially of 14 parts by weight of polyethylene glycol having a molecular weight of about 20,000, 56 parts by weight of polyethylene glycol having a molecular weight of about 6,000, 10 parts by weight of a mixture of finely divided mica and spun glass fiber, and 20 parts by weight of precipitated calcium carbonate (CaCO$_3$).

References Cited by the Examiner

UNITED STATES PATENTS 2,399,085    4/1946    Winslow    106—287

ALLAN LIEBERMAN, *Acting Primary Examiner.*

MORRIS LIEBMAN, *Examiner.*